(12) United States Patent
Brachert et al.

(10) Patent No.: US 7,263,982 B2
(45) Date of Patent: Sep. 4, 2007

(54) METHOD FOR OPERATING AND INTERNAL COMBUSTION ENGINE

(75) Inventors: Götz Brachert, Stuttgart (DE); Rüdiger Herweg, Esslingen (DE); Kai Kanning, Stuttgart (DE); Matthias Pfau, Ludwigsburg (DE); Jochen Schäflein, Stuttgart (DE); Hans-Jürgen Weimann, Oppenweiler (DE)

(73) Assignee: Diamler Chrysler AG, Stuttgart (DE)

( * ) Notice: Subject to any disclaimer, the term of this patent is extended or adjusted under 35 U.S.C. 154(b) by 0 days.

(21) Appl. No.: 11/411,198

(22) Filed: Apr. 25, 2006

(65) Prior Publication Data

US 2006/0225694 A1 Oct. 12, 2006

Related U.S. Application Data

(63) Continuation-in-part of application No. PCT/EP2004/011518, filed on Oct. 14, 2004.

(30) Foreign Application Priority Data

Oct. 29, 2003 (DE) ................................ 103 50 796

(51) Int. Cl.
*F02B 47/08* (2006.01)
*F02B 47/10* (2006.01)
(52) U.S. Cl. .................... 123/568.14; 123/299
(58) Field of Classification Search .......... 123/568.14, 123/568.13, 568.11, 58.7, 58.8, 299, 305, 123/528, 559.1, 565
See application file for complete search history.

(56) References Cited

U.S. PATENT DOCUMENTS 6,336,436 B1 * 1/2002 Miyakubo et al. .......... 123/295
6,499,458 B1 * 12/2002 Nieberding ................. 123/299
6,508,229 B2 * 1/2003 Miyakubo et al. .......... 123/305
2002/0046741 A1 4/2002 Kakuho et al.
2002/0162320 A1 * 11/2002 Uchida et al. ................ 60/284

FOREIGN PATENT DOCUMENTS

| DE | 198 10 935 | 9/1999 |
| EP | 1 164 277 | 12/2001 |
| EP | 1 389 679 | 2/2004 |
| JP | 63215836 A * | 9/1988 |
| WO | WO 02/097255 | 12/2002 |

* cited by examiner

*Primary Examiner*—Mahmoud Gimie
(74) *Attorney, Agent, or Firm*—Klaus J. Bach

(57) ABSTRACT

In a method of operating a supercharged internal combustion engine in which exhaust gas is retained in the combustion chamber during a charge change, wherein the engine is operated with compression ignition or with spark ignition depending on the operating point and in which a charge pressure can be established for the fresh air supplied to the combustion chamber, and the exhaust gas is compressed during the charge change, and a first fuel quantity is optionally injected into the retained exhaust gas and a second fuel quantity is subsequently supplied to the combustion chamber, such that a homogeneous fuel/air mixture is formed in the combustion chamber, the retained exhaust gas quantity in the combustion chamber is corrected in such a way that the center of the combustion is displaced in the direction toward a set point value when the center of the combustion deviates from the set point value because of a change in the charge pressure of the fresh air or because of a change in the temperature of the fresh air.

8 Claims, 2 Drawing Sheets

METHOD FOR OPERATING AND INTERNAL COMBUSTION ENGINE

This is a Continuation-In-Part Application of International Application PCT/EP2004/011518 filed 14 Oct. 2004 and claiming the priority of German application 103 50 796.5 filed 29 Oct. 2003.

BACKGROUND OF THE INVENTION

The invention relates to a method of operating a supercharged internal combustion engine, in particular an auto-ignition internal combustion engine with direct fuel injection including a cylinder with a cylinder head having inlet and outlet valves and a piston movably disposed in the cylinder.

In direct-injection internal combustion engines with auto- or compression-ignition, lean homogeneous fuel/air mixtures are often made to auto-ignite so that high engine efficiency levels and lower exhaust emissions are obtained. In such internal combustion engines, that is, internal combustion engines with compression ignition, a lean basic mixture of air, fuel and retained exhaust gas is generally formed during operation of the engine under partial load and auto-ignited. During full load engine operation, a stoichiometric mixture is frequently formed and spark-ignited. In order to optimize the operation of such internal combustion engines, attempts are made to extend the compression ignition combustion operating mode and the characteristic diagram range in the compression ignition mode of operation toward larger loads. Such extension of the operating range with compression ignition however is restricted by a lack of air since sufficient quantities of fresh air for the conversion of large quantities of injected fuel with a predefined overall level of efficiency are not availably, in particular in the full load range and at high rotational speeds of the engine. One possible way of overcoming such a lack of air resides in supercharging the engine with fresh air.

According to the current state of the art, it is difficult to control supercharged internal combustion engines with compression ignition since the time of auto-ignition depends very greatly on the parameters of the engine and the ambient conditions.

It is therefore the object of the invention to provide a method of operating a supercharged internal combustion engine under optimized conditions in terms of efficiency both in an auto-ignition mode and in a spark ignition mode of operation.

SUMMARY OF THE INVENTION

In a method of operating a supercharged internal combustion engine in which exhaust gas is retained in the combustion chamber during a charge change, wherein the engine is operated with compression ignition or with spark ignition depending on the operating point and in which a charge pressure can be established for the fresh air supplied to the combustion chamber, and the exhaust gas is compressed during the charge change, and a first fuel quantity is optionally injected into the retained exhaust gas and a second fuel quantity is subsequently supplied to the combustion chamber, such that a homogeneous fuel/air mixture is formed in the combustion chamber, the retained exhaust gas quantity in the combustion chamber is corrected in such a way that the center of the combustion is displaced in the direction toward a set point value when the center of the combustion deviates from the set point value because of a change in the charge pressure of the fresh air or because of a change in the temperature of the fresh air.

As a result of the method according to the invention, the auto-ignition operating range of the internal combustion engine can be extended toward larger loads, while retaining an optimized level of efficiency, by varying the charge pressure. If, for example, the charge pressure is increased as a function of the load point, the composition of the mixture changes since more fresh air is fed to the combustion chamber. As a result, the center of the combustion is displaced. The center of the combustion corresponds to a crank angle value at which a 50% conversion of the fuel quantity involved in the combustion has taken place. A change in the retained quantity of exhaust gas according to the invention allows the center of combustions to be displaced in the direction toward a set point value. A displacement of the center of combustion occurs with compression ignition also by changing the fresh air temperature, which could be achieved for example by cooling of the charge air. Such displacement of the center of combustion can also be compensated for by varying the retained quantity of exhaust gas. The retained quantity of exhaust gas can be changed for example in order to displace the center of combustion in the direction of a set point value when the exhaust gas back pressure changes, which adversely affects the combustion.

The method according to the invention brings about an increase in the air/fuel ratio at high loads, as a result of which the fuel consumption and exhaust gas emissions, in particular the nitrogen oxide emissions, are reduced, accompanied by an operating mode which is optimized in terms of efficiency.

In a refinement of the invention, during the compression ignition mode an auto-ignition time of the fuel/air mixture which is formed from the first and second fuel quantities is set as a function of a quantity ratio of the first fuel injection quantity and the second fuel injection quantity.

The injection of the first fuel quantity into the retained exhaust gas brings about optimum homogenization or pre-conditioning of the first fuel injection quantity, which leads to an increase in mixture reactivity of the fuel/air mixture which is formed from the first and second fuel injection quantities. This favors the initiation of the auto-ignition, in particular at operating points with a low exhaust gas temperature.

In a further refinement of the invention, the quantity ratio of the first fuel injection quantity and the second fuel injection quantity of 1:100 to 2:1, in particular 1:5 to 1:3, is set. As a result the preconditioning effect can be adapted to the current operating point by means of the first fuel quantity. The injection of the second fuel quantity preferably takes place in synchronism with induction so that the reactivity of the mixture which is set by means of the first fuel injection quantity is neither increased nor decreased. The second fuel injection quantity is thus primarily used to set a desired load.

According to a further refinement of the invention, a center of the combustion is set by injecting a third fuel quantity, which is carried out after the injection of the second fuel quantity ends and preferably before a top dead center position of the piston. The third fuel quantity is aimed at reducing the reactivity of the total cylinder charge in particular under high loads. This is intended to reduce high burning speeds and large pressure rises in the combustion chamber.

Further features of the method according to the invention will become apparent from the following description of exemplary embodiments of the invention with reference to the accompanying drawings:

DESCRIPTION OF A PARTICULAR EMBODIMENT

Figure 3:
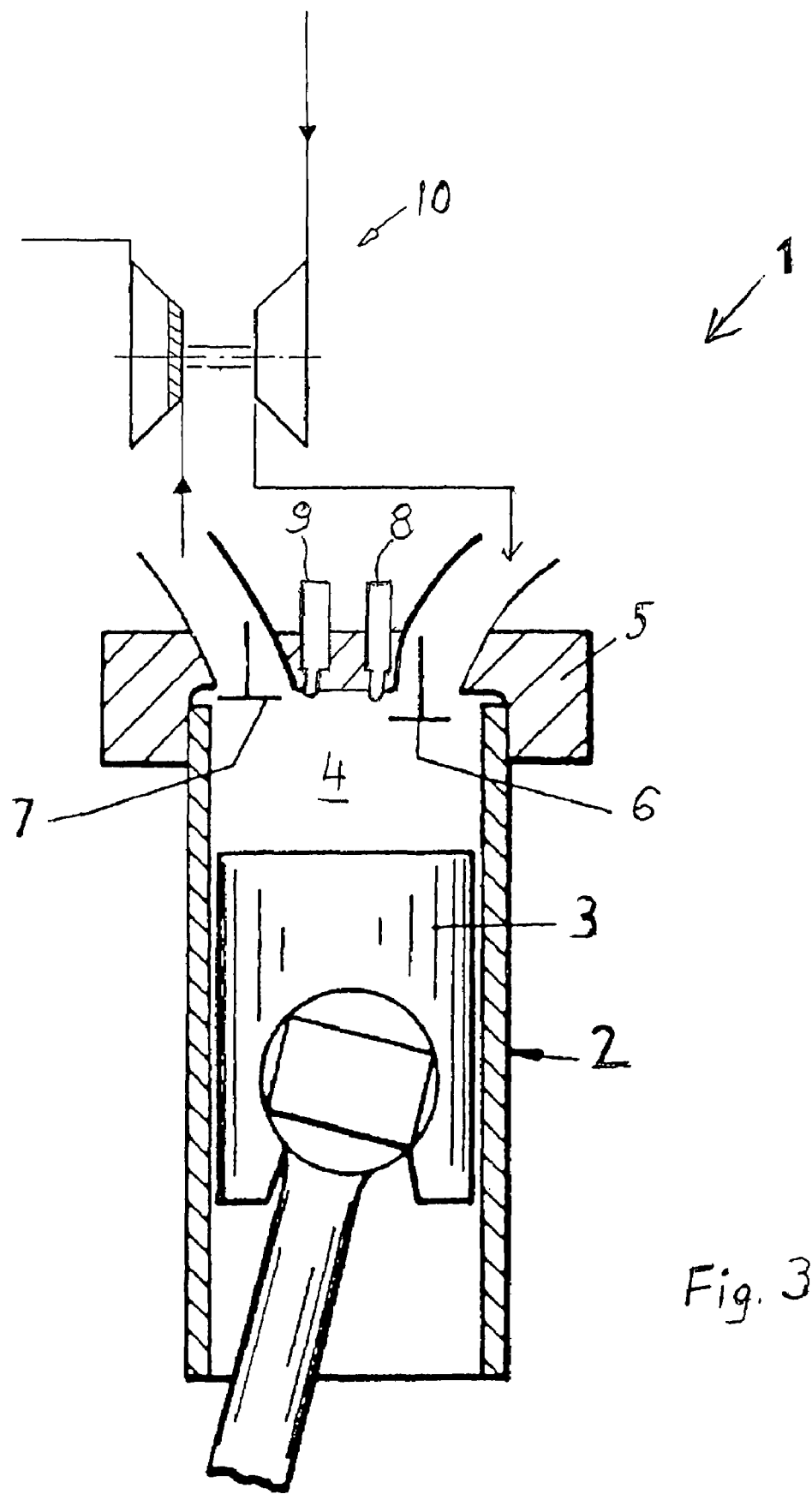
FIG. 3 shows schematically a supercharged internal combustion engine.

An exemplary supercharged internal combustion engine with compression ignition as shown in FIG. 3 preferably comprises four or more cylinders 2 in each of which a piston 3 is movably supported and a combustion chamber 4 is formed between the piston 3 and a cylinder head 5 for the combustion of a fuel/air mixture. The combustion chamber 4 of the internal combustion engine 1 is closed off at the top by the cylinder head 5, the piston 3 delimiting the combustion chamber 4 at the bottom. Each combustion chamber 4 comprises at least one inlet valve 6, at least one outlet valve 7, a fuel injector 8 and an ignition source 9, which is preferably a spark plug. Furthermore, the internal combustion engine comprises an air supply device 10, preferably in the form of an exhaust gas turbocharger, in which a charge pressure can be generated for the fresh air which is fed to the combustion chamber 4. Alternatively, a mechanical supercharger can be used instead of the exhaust gas turbocharger.

The internal combustion engine operates according to the four-stroke principle and it can be operated as a spark ignition engine, i.e. in a spark ignition or a compression, that is auto-ignition mode, depending on the engine load point. In a four-stroke engine, one stroke corresponds to a movement of the piston over the full travel lengths thereof in either direction. The working cycle of the internal combustion engine which is composed of four strokes corresponds to one combustion cycle, a combustion cycle starting with a first intake stroke at a top dead center position of the piston of a charge change wherein the piston moves downwardly to a bottom dead center position. During the intake stroke, the combustion chamber is filled with combustion air, which is added to a specific quantity of exhaust gas that has been retained in the combustion chamber in an exhaust stroke of a previous working cycle.

Figure 1:
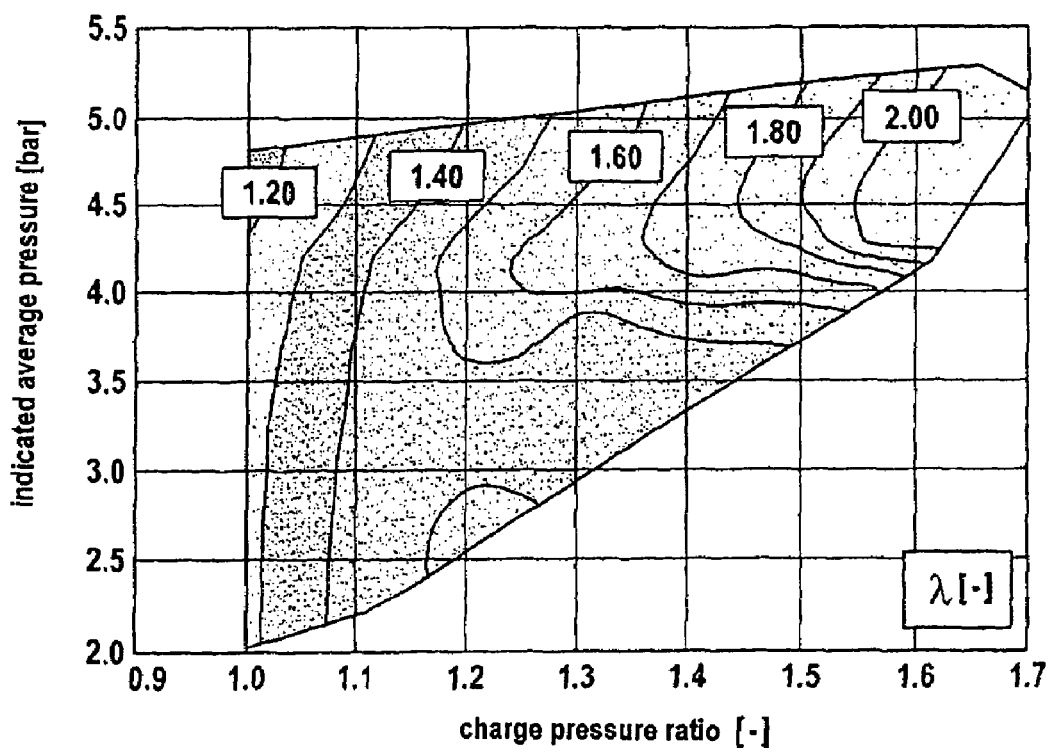
FIG. 1 is an illustration of profiles of different air/fuel ratios for a supercharged internal combustion engine as a function of a load and a charge pressure ratio.
Figure 2:
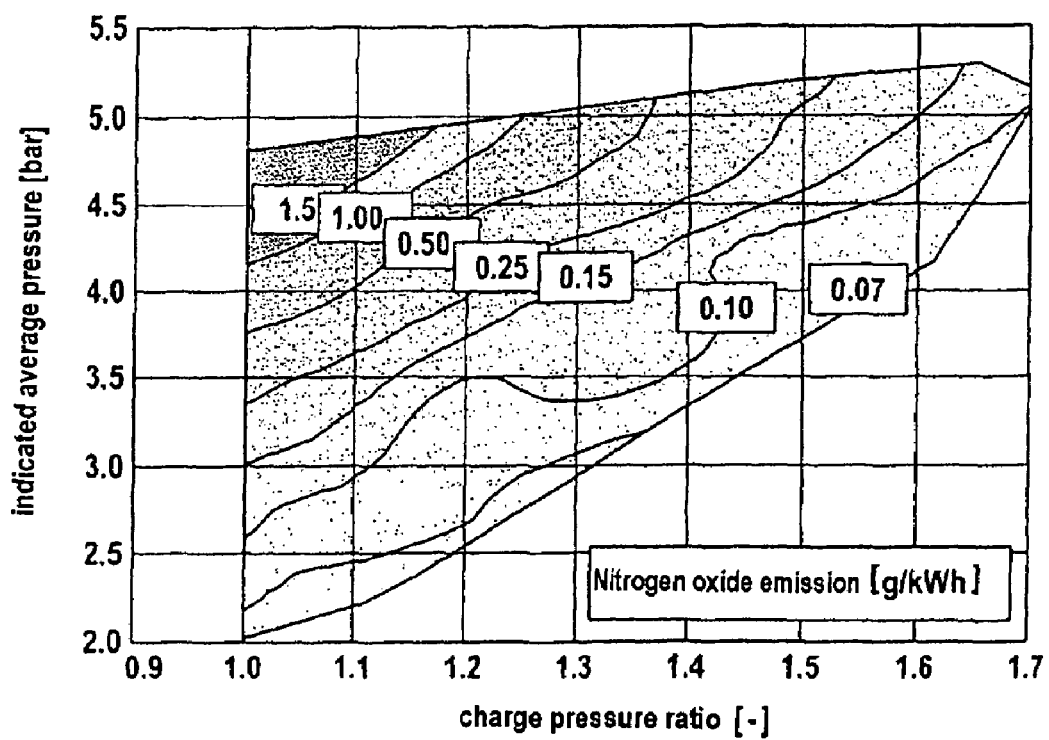
FIG. 2 is a schematic diagram of nitrogen oxide profiles as a function of the load and the charge pressure ratio.

The method according to the invention is aimed at extending the compression-ignition operating range of the internal combustion engine, while maintaining an optimized level of efficiency, by varying the charge pressure in the direction of larger loads. By using the exhaust gas turbocharger it is possible to increase the charge pressure so that the engine can also be operated at higher load points according to FIG. 1 in the compression ignition mode using a lean mixture, for example with a high air-fuel ratios $\lambda>1$. Since the composition of the mixture changes as more fresh air is fed to the combustion chamber, the center of the combustion would normally be moved away from a set point value. As a result, the efficiency level of the internal combustion engine would worsen and the nitrogen oxide emissions would increase. However, a change in the retained quantity of exhaust gas according to the invention allows the center of combustion to be moved back in the direction of the set point value, thus providing for the optimized efficiency level to be retained while simultaneously minimizing the nitrogen oxide emissions. Accordingly, the displacement of the center of combustion can be virtually compensated for very quickly and in a selective fashion without a large degree of expenditure. As a result, according to the invention the air/fuel ratio can be increased at high loads, permitting the nitrogen oxide emissions to be considerably reduced as apparent from FIG. 2.

Alternatively, the internal combustion engine can still be operated in a spark ignition mode, i.e. the cylinder charge is spark ignited, at very high loads, in particular in the full load range.

According to the invention, during the compression ignition mode, a specific mixture reactivity of a fuel/air mixture is formed from the first fuel injection quantity, which is injected into the exhaust gas retained in the combustion chamber and a subsequent, second fuel quantity is supplied together with fresh air to the combustion chamber. Closed-loop or open-loop control can be used for the initiation of the compression ignition. This is advantageous in particular at operating points where the exhaust gas temperature is low since certain charge pressure ratios are required for the supercharging process to be successful. As a result, reliable operation of the internal combustion engine with compression ignition is made possible also at lower rotational speed and in load ranges.

The first fuel quantity makes available a relatively large amount of energy or provides for a relatively high temperature level for a subsequent main combustion, so as to compensate for energy losses due to the relatively small fuel quantity which is converted during low engine oads operation. As a result, the current operating range with compression ignition is extended so that further improved engine operating efficiency and reduced exhaust gas emissions can be obtained, for example in the idling mode. The first fuel injection is preferably performed between the closing of the outlet valve and the opening of the inlet valve. Alternatively, the first fuel quantity can be injected into the exhaust gas retained in the combustion chamber during the exhaust stroke of the internal combustion engine between the closing of the outlet valve and 270° Ca before a top dead center of the ignition.

Alternatively, the first fuel quantity can be supplied to the combustion chamber in a range between the closing of the outlet valve and the top dead center position of the piston. As a result, conversion-like reactions are increased during the first fuel injection. The injection of the first fuel quantity leads to the conversion-like reactions with which the final temperature of the mixture is influenced. As a result, the compression-ignition timing is influenced. The first fuel quantity is preferably between 0% and 30% of the total fuel quantity, and the second fuel quantity can be between 40% and 100% of the total fuel quantity supplied to the combustion chamber.

The second fuel quantity supplied to the combustion chamber forms the main mixture which is compressed in the compression stroke. During the compression stroke, the piston moves in an upward direction from the bottom dead center to the top dead center position. The main mixture is ignited in a region of the top dead center position of the piston by compression in the combustion chamber. According to the invention, the compression-ignition time of the fuel/air mixture which is formed from the first and second fuel quantities can be set as a function of a quantity ratio of the first fuel quantity and the second fuel quantity. A particularly advantageous preconditioning of the main mixture occurs with a quantity ratio of between 1:5 and 1:3. The second fuel quantity is preferably injected into the combustion chamber in a range between 300° Ca and 120° Ca before the top dead center position of the piston.

While the combustion of the main mixture is still occurring, the piston moves downwardly as far as to the bottom center position. The center of the combustion can be optimized as a function of the load point according to the invention by means of an injection of a third fuel quantity. The variation of the retained quantity of exhaust gas in combination with the injection of a third fuel quantity serves primarily to optimize the compression-ignition mode while maintaining a virtually ideal level of efficiency, in particular at very small loads and large loads since, in these operating ranges, an optimized compression-ignition mode of homogeneous mixtures cannot be easily established.

The third fuel quantity is optionally injected before or after the initiation of the compression-ignition. It is preferably injected before the top dead center position of the piston so that the reactivity of the main mixture or of the total cylinder charge can be reduced or changed. The third fuel injection can advantageously control the period of combustion as a function of its injection time and/or its quantity. As a result, steep rises in pressure in the combustion chamber can be prevented and better exhaust gas emissions can thus be obtained. The third fuel quantity is preferably between 10% and 30% of the total fuel quantity.

What is claimed is:

1. A method of operating a supercharged internal combustion engine having a cylinder, a cylinder head including inlet and outlet valves, a piston movably disposed in the cylinder and defining a combustion chamber between the cylinder head and the piston, to which fresh air is supplied by an air supply device whose air charge pressure can be controlled for supplying fresh air to the combustion chamber of the engine under a controllable pressure, said method comprising the steps of:

operating the internal combustion engine selectively in a compression ignition or in a spark ignition mode of engine operation depending on the engine operating point, and, in the compression ignition mode, retaining exhaust gas in the combustion chamber which is compressed during a charge change, optionally injecting a first fuel quantity into the retained exhaust gas, subsequently supplying a second fuel quantity to the combustion chamber together with fresh air so that a homogeneous fuel/air mixture is formed in the combustion chamber, combusting the fuel/air mixture over a period having a center of combustion, and correcting the amount of the exhaust gas quantity retained in the combustion chamber when the center of combustion deviates from a set point value because of a change in the charge pressure of the fresh air or because of a change in the temperature of the fresh air in such a way that the center of the combustion is displaced toward the set point value.

2. The method as claimed in claim 1, wherein an auto-ignition time for the fuel/air mixture, which is formed from the first and second fuel quantities, is established as a function of a quantity ratio of the first fuel quantity and the second fuel quantity.

3. The method as claimed in claim 2, wherein the quantity ratio of the first fuel quantity and the second fuel quantity is between 1:100 and 2:1.

4. The method according to claim 3, wherein the quantity ratio is between 1:5 and 1:3.

5. The method as claimed in claim 1, wherein the center of combustion is established by injecting a third fuel quantity, the third fuel quantity being injected after completion of the injection of the second fuel quantity and before the piston has reached its top dead center position.

6. The method as claimed in claim 5, wherein a combustion duration is established as a function of the third fuel quantity and the injection timing for the third fuel quantity.

7. The method as claimed in claim 1, wherein the first fuel quantity is 0% to 30% of the total fuel quantity, and the second fuel quantity is 40% to 100% of the total fuel quantity.

8. The method as claimed in claim 5, wherein the third fuel quantity is 10% to 30% of the total fuel quantity.

* * * * *